May 19, 1925. 1,538,724
H. H. MILLS
SURFACING ATTACHMENT FOR CULTIVATORS
Filed May 25, 1922

WITNESSES
H. T. Walker

INVENTOR
HENRY H. MILLS
BY
ATTORNEYS

Patented May 19, 1925.

1,538,724

UNITED STATES PATENT OFFICE.

HENRY H. MILLS, OF MAYNARD, MINNESOTA.

SURFACING ATTACHMENT FOR CULTIVATORS.

Application filed May 25, 1922. Serial No. 563,602.

*To all whom it may concern:*

Be it known that I, HENRY H. MILLS, a citizen of the United States, and a resident of Maynard, in the county of Chippewa and State of Minnesota, have invented a new and Improved Surfacing Attachment for Cultivators, of which the following is a full, clear, and exact description.

This invention has relation to agricultural implements and refers more particularly to an attachment for cultivators or other implements of this type which include a wheeled frame having a beam, the same being in the nature of detachable elements including blades adapted to be associated with the beam or supporting element of the implement. The invention contemplates a simple and effective means for levelling the ground which consists in the substitution of the surfacing elements for the cultivator shovels after the same have been previously employed in the usual manner.

As a further object the invention contemplates an attachment by which a one-row implement may be converted into an implement which will operate over a plurality of rows.

The invention further contemplates a surfacing attachment of the character set forth which includes elements each provided with a pair of pivotally connected horizontally disposed blades with the means for changing the relative angularity of the blades by a simple form of adjustment.

As a further object the invention contemplates an attachment which is comparatively simple in its construction, inexpensive to manufacture and which is readily applicable to or removable from a cultivator or other device of this character.

With the above recited and other objects in view, the invention resides in the novel construction, set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed and by variations in the phraseology of the same.

In the drawings—

Figure 1:
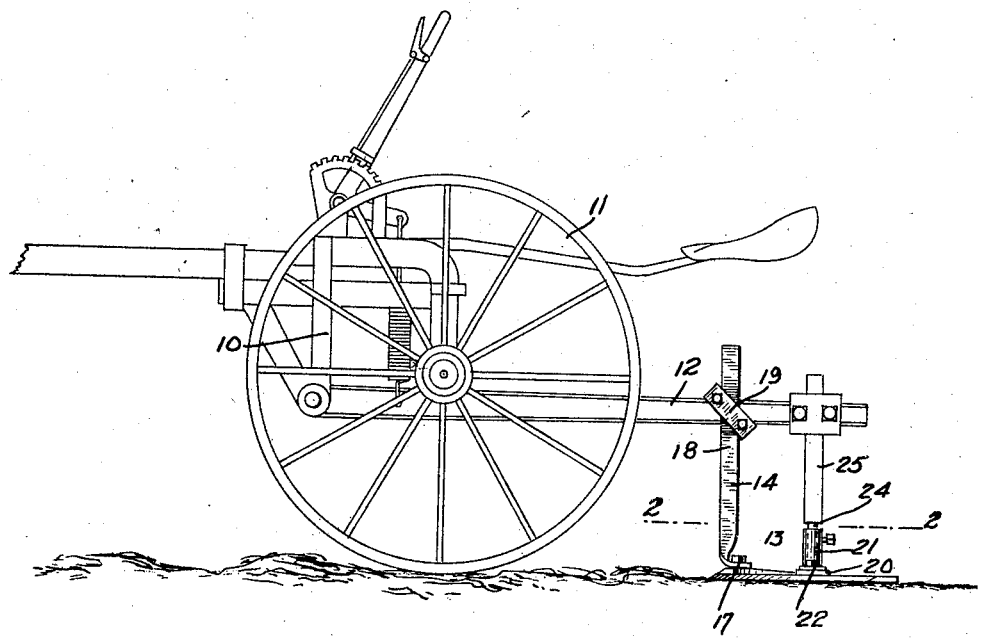
Figure 1 is a side elevation of a cultivator illustrating the attachment applied thereto.
Figures 2, 3:
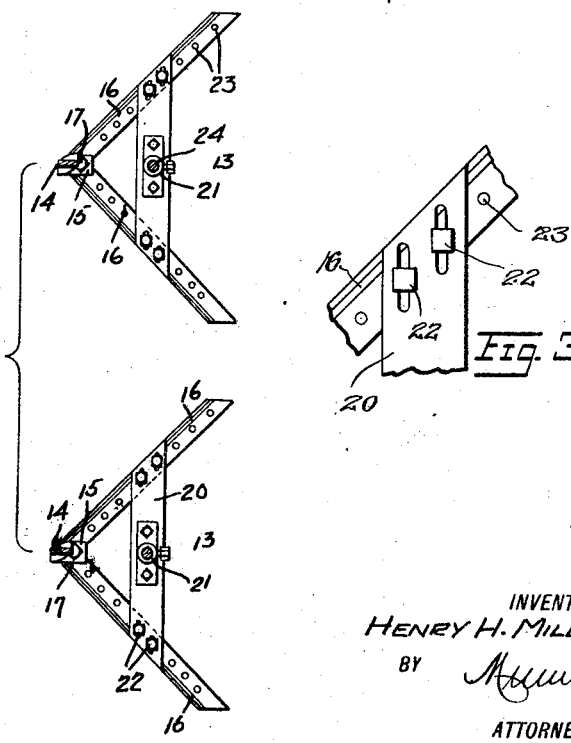
Fig. 2 is a sectional plan view taken approximately on the line 2—2 of Fig. 1.

Referring to the drawings by characters of reference, 10 designates one form of a wheeled frame provided with supporting wheels 11 and a rearwardly extending draw-bar or beam 12 with which in ordinary practice the cultivator shovels are associated. The attachment constituting the invention consists of surfacing elements 13 each of which comprises a standard 14 having a rearwardly disposed angular foot 15 at its lower extremity with which a pair of levelling blades 16 are pivotally connected at their forward ends as at 17. The standards 14 are bent inwardly and upwardly as at 18 to space the elements 13 apart transversely when the upper extremities of the standards are secured to the opposite side of the draw-bar or beam by the clamping devices 19. The means for bracing the blades 16 and securing the same in relatively adjusted position consists of a cross-bar 20 provided with an upstanding socket member 21 and apertured at its opposite extremities to receive the retaining bolts 22 which are passed through the apertures 23 in the blades. The socket member 21 is designed to receive the reduced extremity 24 of a common shovel shank at 25 depending from the draw-bar or beam 12. It is obvious that upon shifting the cross-bar 20 forwardly, the rear extremities of the blades will be separated to a greater extent, while upon shifting the same rearwardly the rear extremities will be advanced toward each other whereby to obtain adjustments in the angularity of the blades.

In use of the device after the cultivator has been used in the ordinary manner by the employment of the usual cultivator shovels, said shovels are removed and the elements 13 are secured in place. By drawing the cultivator over the ground, the blades 16 will operate to level the ground.

I claim:

1. A ground leveling attachment for cultivators of the type which include a draw-bar having a depending shovel shank provided with a reduced lower end, said attachment including a vertical attaching shank, a pair of horizontal blades pivotally connected at their forward ends to the lower end thereof for relative lateral swinging movement, said blades having vertical spaced openings therein, a cross bar having slotted opposite ends adapted for registry with the openings in the blades, means adapted to extend through said slots and openings for adjustably connecting the blades in rearwardly diverging relation, and a socket member provided centrally on the upper side of the cross bar for receiving the reduced lower end of the shovel shank whereby to hold the blades at their rear ends against upward movement.

2. The combination with a cultivator having a draw-bar and a downwardly projecting shovel shank having a reduced lower end, of a ground leveling attachment therefor comprising a standard secured to the draw-bar and projecting downwardly therefrom, a pair of rearwardly diverging horizontally disposed leveling blades pivoted to the lower end of said standard for relative swinging movements, a means of connection between said blades for varying the relative angular adjustments thereof, and a socket member carried by said means of connection for receiving the lower reduced end of the shovel shank whereby to hold the blades against upward movement at their rear ends.

HENRY H. MILLS.